(12) United States Patent
Johnson et al.

(10) Patent No.: US 12,454,904 B2
(45) Date of Patent: *Oct. 28, 2025

(54) REAL-TIME CONTROL OF REDUCTANT DROPLET SPRAY MOMENTUM AND IN-EXHAUST SPRAY DISTRIBUTION

(71) Applicant: CUMMINS EMISSION SOLUTIONS INC., Columbus, IN (US)

(72) Inventors: Samuel Johnson, East Wenatchee, WA (US); Nassim Khaled, Decatur, GA (US); Patrick C. Hudson, Indianapolis, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,699

(22) Filed: Sep. 19, 2024

(65) Prior Publication Data

US 2025/0012210 A1 Jan. 9, 2025

Related U.S. Application Data

(63) Continuation of application No. 18/406,857, filed on Jan. 8, 2024, now Pat. No. 12,152,525, which is a
(Continued)

(51) Int. Cl.
*F01N 3/20* (2006.01)
*B01D 53/94* (2006.01)
(Continued)

(52) U.S. Cl.
CPC .......... *F01N 3/208* (2013.01); *F01N 3/0814* (2013.01); *F01N 9/00* (2013.01); *B01D 53/9418* (2013.01);
(Continued)

(58) Field of Classification Search
CPC ........ F01N 3/025; F01N 3/0253; F01N 3/208; F01N 2610/146; F01N 2900/08; F01N 2900/10; F01N 2900/1806–1824
See application file for complete search history.

(56) References Cited

U.S. PATENT DOCUMENTS 11,028,754 B2 * 6/2021 Johnson ................ F01N 3/0814
11,459,928 B2 * 10/2022 Johnson ................ F01N 3/0814
(Continued)

FOREIGN PATENT DOCUMENTS

CN 101598057 A 12/2009
CN 103429860 A 12/2013

OTHER PUBLICATIONS

Office Action issued in Chinese Patent Application No. CN201780074672.9, dated Oct. 10, 2020.
(Continued)

*Primary Examiner* — Laert Dounis
(74) *Attorney, Agent, or Firm* — Foley & Lardner LLP

(57) ABSTRACT

A system includes: a reductant injection system for injecting reductant into an exhaust gas based on an injection parameter or a supply parameter; and a controller configured to: access a current engine condition parameter, wherein the current engine condition parameter includes at least one of an engine fuel flow rate, an engine air flow rate, an engine boost pressure, an engine intake pressure, an engine load, an engine rotational speed, an engine cylinder temperature, an engine cylinder pressure, or an engine fuel pressure, determine one or more control parameters based on a control model and as a function of the accessed current engine condition parameter, and modify a value of the injection parameter or the supply parameter based on the one or more
(Continued)

control parameters to control a reductant spray momentum, a reductant droplet momentum, or a reductant momentum vector.

20 Claims, 8 Drawing Sheets

Related U.S. Application Data continuation of application No. 17/897,467, filed on Aug. 29, 2022, now Pat. No. 11,905,874, which is a continuation of application No. 17/233,868, filed on Apr. 19, 2021, now Pat. No. 11,459,928, which is a continuation of application No. 16/467,434, filed as application No. PCT/US2017/064923 on Dec. 6, 2017, now Pat. No. 11,028,754.

(60) Provisional application No. 62/431,092, filed on Dec. 7, 2016.

(51) Int. Cl.
*F01N 3/08* (2006.01)
*F01N 9/00* (2006.01)

(52) U.S. Cl.
CPC ............ *F01N 2610/02* (2013.01); *F01N 2610/1453* (2013.01); *F01N 2610/146* (2013.01); *F01N 2900/08* (2013.01); *F01N 2900/10* (2013.01); *F01N 2900/1404* (2013.01); *F01N 2900/1406* (2013.01); *F01N 2900/1411* (2013.01); *F01N 2900/1808* (2013.01); *F01N 2900/1811* (2013.01); *F01N 2900/1821* (2013.01); *F01N 2900/1824* (2013.01); *Y02T 10/12* (2013.01)

(56) References Cited

U.S. PATENT DOCUMENTS

| | | | | |
|---|---|---|---|---|
| 11,905,874 | B2* | 2/2024 | Johnson | F01N 9/00 |
| 12,152,525 | B2* | 11/2024 | Johnson | F01N 3/0814 |
| 2009/0063087 | A1 | 3/2009 | Grichnik et al. | |
| 2011/0113759 | A1 | 5/2011 | Tilinski et al. | |
| 2011/0146240 | A1 | 6/2011 | Wilhelm et al. | |
| 2014/0000247 | A1 | 1/2014 | Adelman et al. | |
| 2014/0311128 | A1 | 10/2014 | Dingle et al. | |
| 2015/0361849 | A1 | 12/2015 | Chiruta et al. | |
| 2017/0089243 | A1 | 3/2017 | Schmitt et al. | |
| 2017/0292426 | A1 | 10/2017 | Cho et al. | |

OTHER PUBLICATIONS

International Search Report and Written Opinion from corresponding PCT Application No. PCT/US2017/064923, dated Feb. 15, 2018, pp. 1-7.

* cited by examiner

REAL-TIME CONTROL OF REDUCTANT DROPLET SPRAY MOMENTUM AND IN-EXHAUST SPRAY DISTRIBUTION

CROSS-REFERENCE TO RELATED APPLICATIONS

This application is a continuation of U.S. patent application Ser. No. 18/406,857, filed Jan. 8, 2024, which is a continuation of U.S. patent application Ser. No. 17/897,467, filed Aug. 29, 2022, which is a continuation of U.S. patent application Ser. No. 17/233,868, filed Apr. 19, 2021 (now U.S. Pat. No. 11,459,928), which is a continuation of U.S. patent application Ser. No. 16/467,434, filed Jun. 6, 2019 (now U.S. Pat. No. 11,028,754), which is the U.S. National Phase of PCT Application No. PCT/US2017/064923, filed Dec. 6, 2017, which claims priority to and the benefit of U.S. Provisional Patent Application No. 62/431,092, filed Dec. 7, 2016 and entitled "REAL-TIME CONTROL OF REDUCTANT DROPLET SPRAY MOMENTUM AND IN-EXHAUST SPRAY DISTRIBUTION." The entire disclosures of these applications are incorporated herein by reference.

TECHNICAL FIELD

The present application relates generally to the field of aftertreatment systems for internal combustion engines.

BACKGROUND

For internal combustion engines, such as diesel engines, nitrogen oxide (NOx) compounds may be emitted in the exhaust. To reduce NOx emissions, a SCR process may be implemented to convert the NOx compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant such as anhydrous ammonia or urea is typically introduced into the exhaust gas flow prior to the catalyst chamber. To introduce the reductant into the exhaust gas flow for the selective catalytic reduction (SCR) process, an SCR system may dose, inject, or otherwise introduce the reductant through a doser that vaporizes, injects, or sprays the reductant into an exhaust pipe of the exhaust system up-stream of the catalyst chamber. The SCR system may include one or more sensors to monitor conditions within the exhaust system.

SUMMARY

Implementations described herein relate to systems and methods for controlling reductant spray for a target spray distribution based on modifying one or more parameters of a reductant injection system or reductant supply system in real-time using current vehicle, engine, exhaust, and/or reductant condition parameters.

One implementation relates to a system for controlling reductant spray momentum for a target spray distribution comprising an exhaust system having an exhaust conduit with exhaust flowing therethrough, a reductant injection system for injecting reductant into the exhaust flowing through the exhaust system based on one or more injection parameters, a reductant supply system for supplying reductant to the reductant injection system based on one or more supply parameters, and a controller. The controller is configured to access current vehicle condition parameters, engine condition parameters, exhaust condition parameters or reductant condition parameters, determine one or more control parameters based on a control model and the accessed current vehicle condition parameters, engine condition parameters, exhaust condition parameters or reductant condition parameters, and modify a value of the one or more injection parameters or the one or more supply parameters to control a reductant spray momentum, a reductant droplet momentum, a reductant spray momentum, or a reductant momentum vector from the reductant injection system for a target spray droplet distribution or a target spray distribution.

In some implementations, the current exhaust condition parameters comprise at least one of an exhaust temperature, an exhaust flow velocity, an exhaust mass flow, or an exhaust vorticity. In some implementations, the current reductant condition parameters include at least one of a reductant temperature, reductant supply pressure, required injection momentum based on exhaust or liquid reductant conditions, a reductant density, an injection frequency, or a nozzle geometry. In some implementations, the control model is an empirical model. A Latin hypercube study may be performed to compute parameters of the empirical model for an exhaust system platform using a range of values for exhaust properties and reductant properties. In some implementations, the control model is a physics based model. Parameters of the physics based model may be obtained by performing a Latin hypercube study for an exhaust system platform using a range of values for exhaust properties and reductant properties. In some implementations, the current vehicle condition parameters can include at least one of a vehicle speed, a vehicle tire pressure, a vehicle inclination angle, a vehicle drive gear selection, a vehicle mass, a vehicle weight, a vehicle trailer weight, or a vehicle air line pressure. In some implementations, the current engine condition parameters can include at least one of an engine fuel flow rate, an engine air flow rate, an engine boost pressure, an engine intake pressure, an engine load, an engine rotational speed, an engine cylinder temperature, an engine cylinder pressure, or an engine fuel pressure. In some implementations, the controller can use the current vehicle condition parameters, engine condition parameters, exhaust condition parameters or reductant condition parameters to determine the reductant spray momentum and modifies one or more injection parameters to achieve a target spray droplet distribution or a target spray distribution for the current vehicle condition parameters, engine condition parameters, exhaust condition parameters or reductant condition parameters.

Another implementation relates to a method that includes accessing current vehicle condition parameters, engine condition parameters, exhaust condition parameters or reductant condition parameters; determining one or more control parameters based on a control model and the accessed current vehicle condition parameters, engine condition parameters, exhaust condition parameters or reductant condition parameters; modifying a value of an injection parameter or a supply parameter to control a reductant spray momentum, a reductant droplet momentum, a reductant spray momentum, or a reductant momentum vector from a reductant injection system for a target spray droplet distribution or a target spray distribution; and commanding a reductant injection system to inject reductant into an exhaust based on the injection parameter or a reductant supply system to supply reductant to the reductant injection system based on the supply parameter.

In some implementations, the current exhaust condition parameters can include at least one of an exhaust pressure, an exhaust density, an exhaust temperature, an exhaust flow velocity, an exhaust mass flow, or an exhaust vorticity. The current reductant condition parameters can include at least one of a reductant temperature, reductant momentum based on an injection supply pressure, a reductant density, an injection frequency, a reductant air supply pressure, a reductant air supply flow rate, a reductant spray cone angle, or a nozzle geometry. The current vehicle condition parameters can include at least one of a vehicle speed, a vehicle tire pressure, a vehicle inclination angle, a vehicle drive gear selection, a vehicle mass, a vehicle weight, a vehicle trailer weight, or a vehicle air line pressure. The current engine condition parameters comprise at least one of an engine fuel flow rate, an engine air flow rate, an engine boost pressure, an engine intake pressure, an engine load, an engine rotational speed, an engine cylinder temperature, an engine cylinder pressure, or an engine fuel pressure. The current vehicle condition parameters, engine condition parameters, exhaust condition parameters or reductant condition parameters can be used to determine the reductant spray momentum and modify the injection parameter to achieve a target spray droplet distribution or a target spray distribution for the current vehicle condition parameters, engine condition parameters, exhaust condition parameters or reductant condition parameters.

Still another implementation relates to a system that includes a reductant injection system for injecting reductant into an exhaust based on an injection parameter or a supply parameter and a controller. The controller is configured to access current exhaust condition parameters or reductant condition parameters, determine one or more control parameters based on a control model and the accessed current exhaust condition parameters or reductant condition parameters, and modify a value of the injection parameter or the supply parameter to control a reductant spray momentum, a reductant droplet momentum, a reductant spray momentum, or a reductant momentum vector from the reductant injection system for a target spray droplet distribution or a target spray distribution.

In some implementations, the current exhaust condition parameters comprise at least one of an exhaust temperature, an exhaust flow velocity, an exhaust mass flow, or an exhaust vorticity. In some implementations, the current reductant condition parameters include at least one of a reductant temperature, reductant supply pressure, required injection momentum based on exhaust or liquid reductant conditions, a reductant density, an injection frequency, or a nozzle geometry. In some implementations, the control model is based on a Latin hypercube study performed to compute parameters of the empirical model for an exhaust system platform using a range of values for exhaust properties and reductant properties.

BRIEF DESCRIPTION

The details of one or more implementations are set forth in the accompanying drawings and the description below. Other features, aspects, and advantages of the disclosure will become apparent from the description, the drawings, and the claims, in which:

Figure 1:
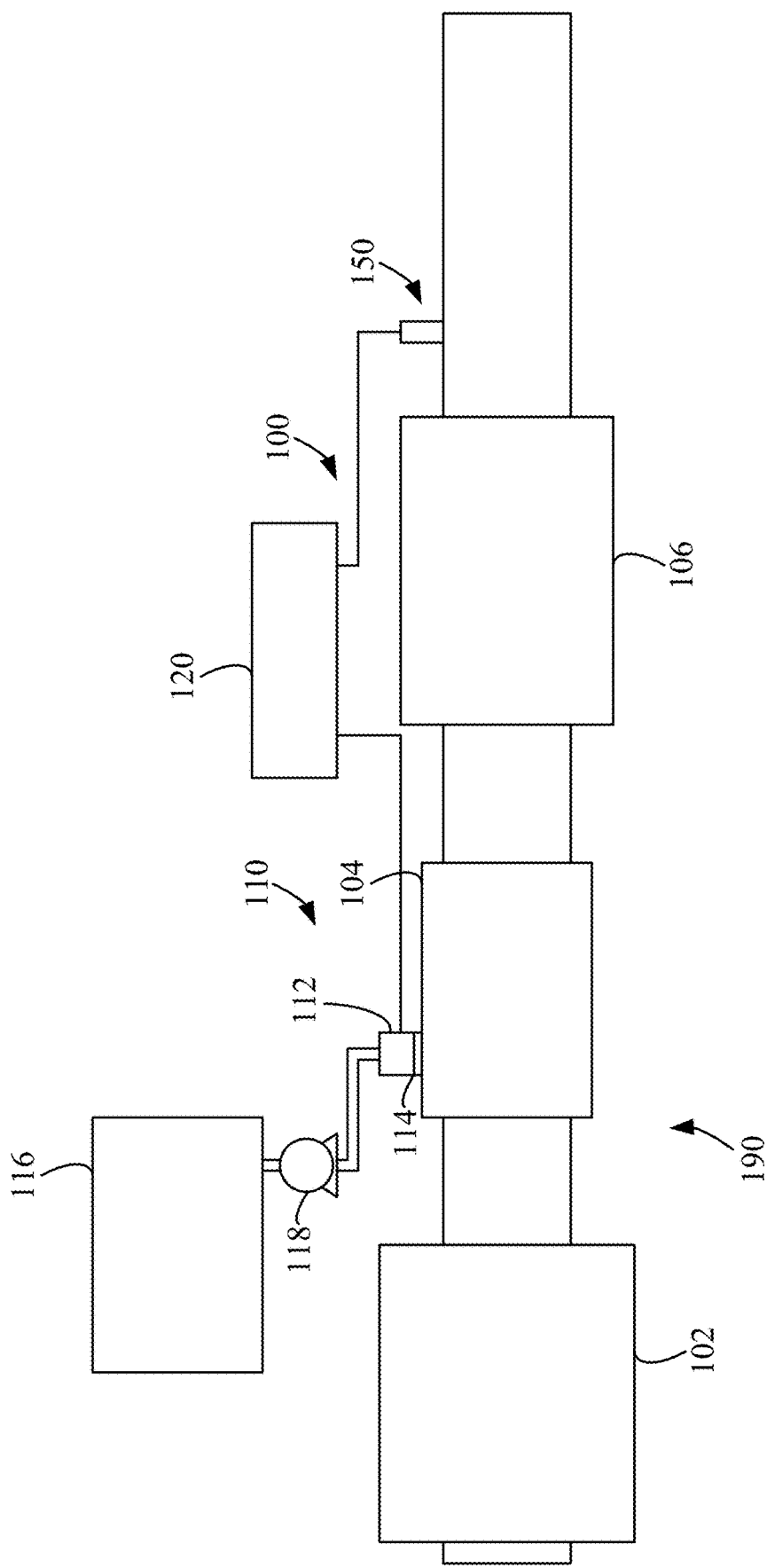
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for real-time control of injection of reductant. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some exhaust aftertreatment systems, the reductant injection system operates with a singular droplet momentum regardless of environmental, e.g. exhaust, conditions. This can lead to an uncontrolled in-exhaust spray distribution and spatial placement (i.e., an uneven amount of reductant in the cross-sectional area of the exhaust stream) at different exhaust conditions. The effectiveness of injected reductant may be affected by several factors, such as a reductant spray quality, droplet diameter (i.e., droplet mass), droplet velocity, droplet trajectory, cone angle, spray in-exhaust distribution, momentum, spray penetration length, final distribution of the decomposed reductant in the exhaust stream, etc. Two controllable characteristics that affect reductant droplet momentum and in-exhaust distribution are droplet diameter and droplet velocity. Nozzle design and supply pressure both can impact the droplet diameter and droplet velocity, and thus affect the droplet momentum. If the diameter and velocity of the reductant droplets are both large values, then, at low exhaust flow velocities, the droplets can penetrate into the exhaust stream too deeply, impacting walls and creating deposits while decreasing NOx reduction efficiency. If the diameter and velocity of the reductant droplets are small values, then, at higher exhaust flow velocities, these droplets tend to 'hug' the exhaust piping walls adjacent to the injector location, thereby limiting the NOx reduction efficiency. Similarly, a large single dose of reductant may be less effective due to the exhaust temperature being unable to sufficiently decompose the reductant prior to a catalyst, while multiple smaller doses of reductant can be more efficiently decomposed by the available exhaust heat energy. Accordingly, providing a system that varies the droplet placement based on droplet momentum and injection timing (i.e., number of doses per unit time) according to engine operation conditions may be useful to improve in-exhaust spray distribution and NOx reduction efficiency.

In some implementations, a real-time reductant delivery system can modify an injection supply pressure, injection frequency, and/or doser nozzle geometry to control the reductant spray momentum based on sensed exhaust and/or liquid reductant conditions, such as exhaust pressure, exhaust density, exhaust temperature, exhaust flow velocity, reductant temperature, reductant velocity based on injection supply pressure, reductant density, etc. Such modification of the reductant spray in real-time can enhance the reductant delivery system's performance and robustness. In particular, by modifying the reductant spray momentum, the in-exhaust spray distribution may be improved, thereby increasing NOx reduction efficiency, and reductant deposits may be reduced.

A reductant delivery system can include hardware, software, electronic, and hydraulic components used to deliver reductant to diesel exhaust gas. A reductant delivery system can be broken down into two subsystems, a reductant supply system and a reductant injection system. The reductant supply system can include a reductant tank storing reductant, a pump, and hydraulic tubing for delivering the reductant from the reductant tank to the pump and to a reductant delivery system. The reductant delivery system can include an injector or doser. In some implementations the reductant delivery system may be a liquid only system that utilizes the pressure from the pump to spray reductant into the exhaust system. In other implementations, the reductant delivery system may be an air-assisted system that includes an air supply source and hydraulic tubing to deliver the air to the reductant injector or doser, upstream of the injector or doser, and/or at the point of reductant injection, to assist in spraying the reductant into the exhaust system.

In some implementations, the control of the reductant spray may be through physical mechanisms and/or software control of the components of the reductant delivery system. For instance, the reductant injection supply pressure may be based on a change to a pump speed command, a movement of an electromechanical valve, a modification of a signal or command for reductant injection frequency, a modification to a doser nozzle geometry, etc. In some instances, the reductant injection supply pressure may also be modified to control the droplet breakup to control the droplet diameter and spray geometry for a desired spray penetration and/or dispersion in the exhaust pipe cross-section. In some implementations, the injection frequency may be modified to control heat transfer inside the pipe at impingement locations as well as spray geometry due to spray development schedule (i.e., how long it takes a spray to materialize to fully developed flow) inside the pipe.

By controlling the injection supply pressure and/or injection frequency, the spray geometry and penetration can be controlled to supply both a well dispersed reductant cloud, as well as a well-placed reductant cloud that both increases distribution and decreases wall impingement, which forms urea deposits, based on engine operating conditions. Thus, real-time targeted spray characteristics can be adjusted during transient engine operation as variation in flow, temperature, or other exhaust conditions affect reductant droplet placement and NOx reduction performance and deposit generation.

II. Overview of Aftertreatment System

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a reactor pipe or decomposition chamber 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a doser 112 configured to dose the reductant into the decomposition chamber 104. In some implementations, the reductant is injected or otherwise inserted upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing NOx emissions and an outlet for the exhaust gas, NOx emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112.

The doser 112 and pump 118 are also electrically or communicatively coupled to a controller 120. The controller 120 is configured to control the doser 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

Figure 7:
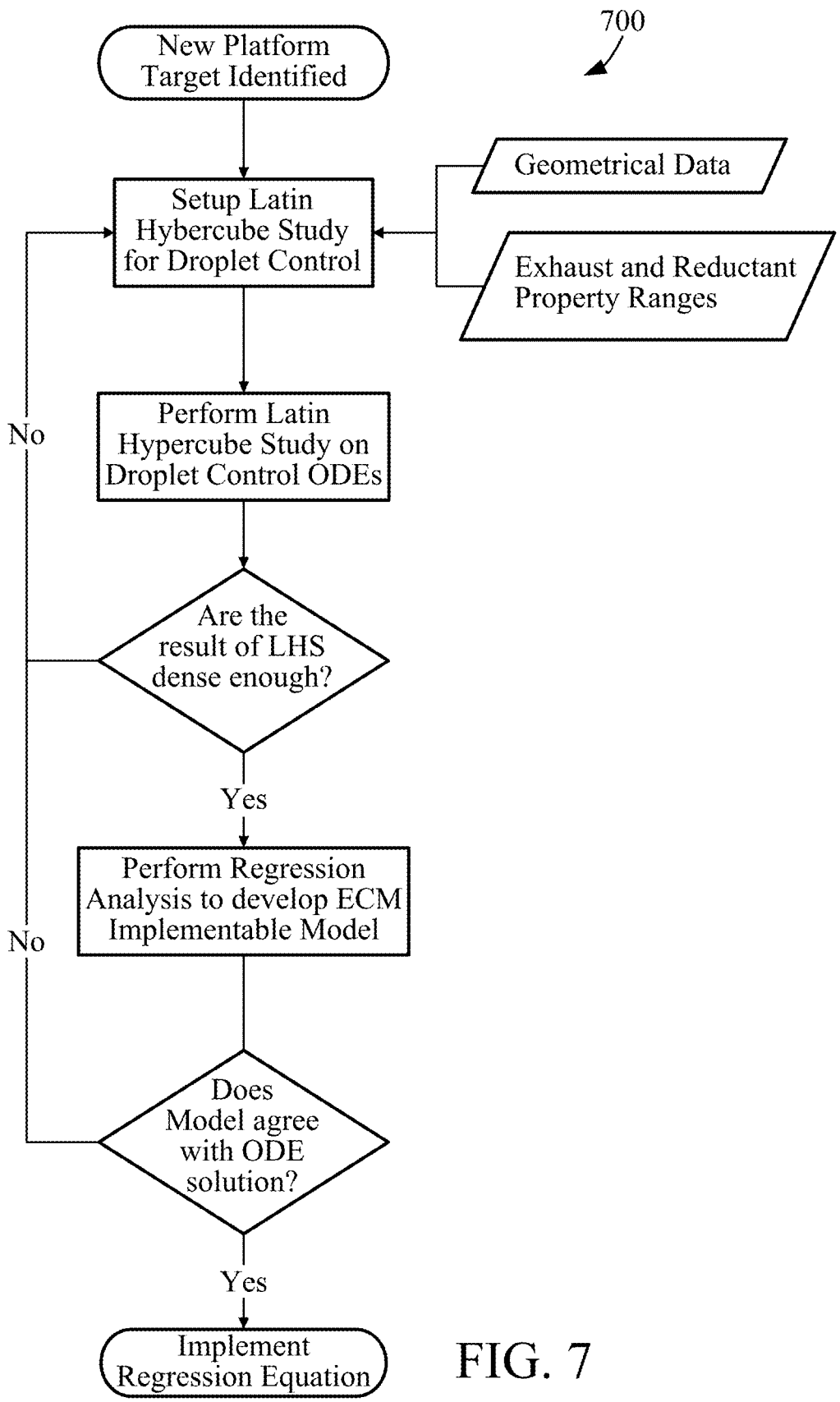
FIG. 7 is a process diagram for developing a control model for droplet control in an exhaust system.
Figure 8:
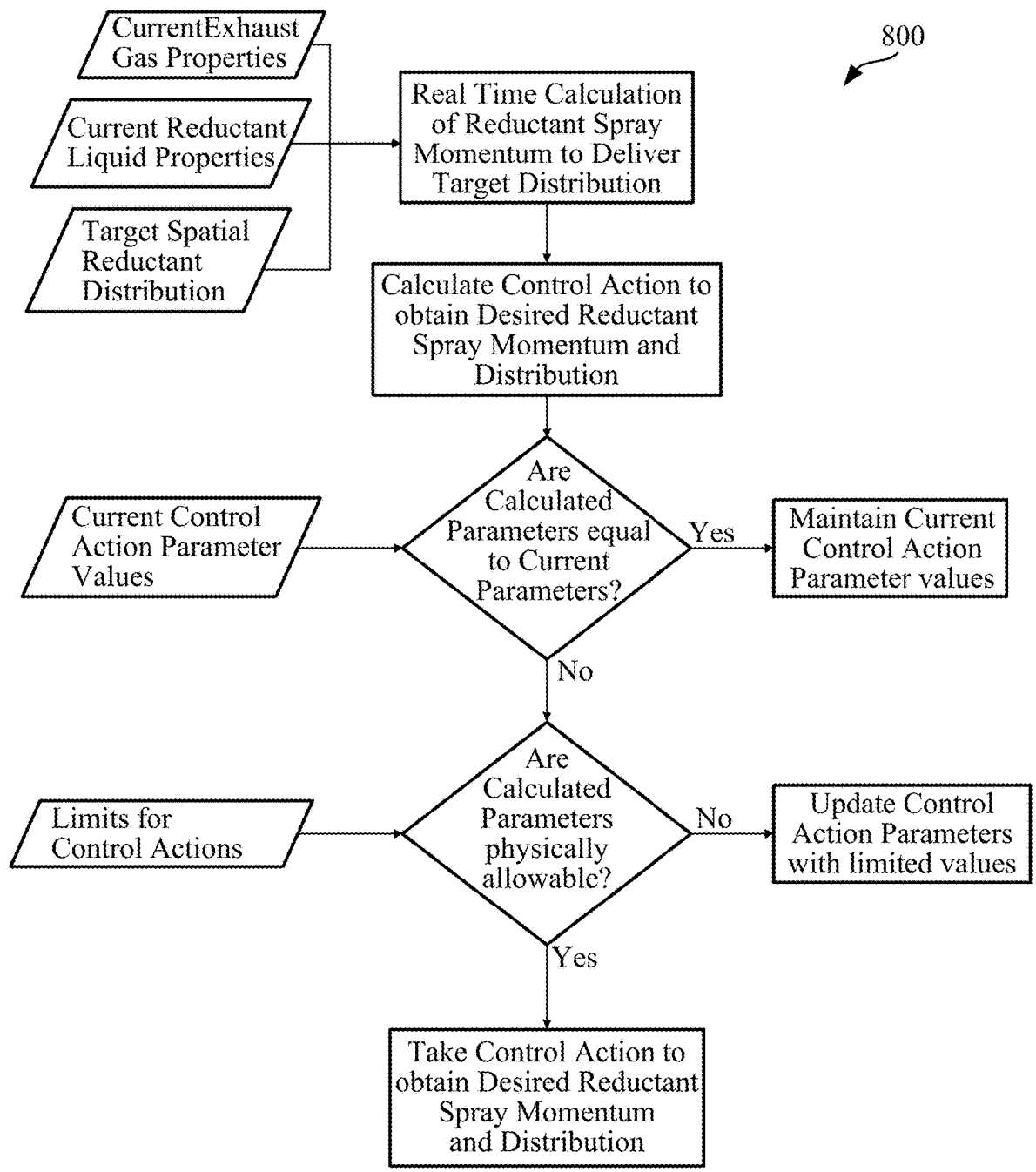
FIG. 8 is a process diagram for implementing the control model for droplet control in an exhaust system.

In certain implementations, the controller 120 is structured to perform certain operations, such as those described herein in relation to FIGS. 7-8. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules structured to functionally execute the operations of the controller 120. In certain implementations, the controller 120 may include a control model module and/or dosing control module for performing the operations described in reference to FIGS. 7-8. The description herein including modules emphasizes the structural independence of the aspects of the controller 120 and illustrates one grouping of operations and responsibilities of the controller 120. Other groupings that execute similar overall operations are understood within the scope of the present application. Modules may be implemented in hardware and/or as computer instructions on a non-transient computer readable storage medium, and modules may be distributed across various hardware or computer based components. More specific descriptions of certain embodiments of controller operations are included in the section referencing FIGS. 7-8.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of NOx emissions by accelerating a NOx reduction process between the ammonia and the NOx of the exhaust gas into diatomic nitrogen, water, and/or carbon dioxide. The SCR catalyst 106 includes an inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the doser 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

III. Real-time Control of Reductant Droplet Spray Momentum and In-Exhaust Distribution Real-time or substantially real-time control of the reductant spray momentum and/or the in-exhaust distribution through control of the reductant droplet diameter and velocity may improve the NOx reduction efficiency of the exhaust aftertreatment system. That is, by improving the in-exhaust distribution proximate to the reductant injection point, the mixing of reductant and NOx present in the exhaust gas can occur further upstream and the reduction of NOx will occur more efficiently with a more uniform mixture of reductant and NOx entering the catalyst. In some instances, this can result in a shortened length for the exhaust aftertreatment system by reducing the length of a decomposition reactor where the reductant and exhaust gas mix and/or the length of the catalyst.

As described herein, a controller can utilize vehicle properties (e.g., a vehicle speed, a vehicle tire pressure, a vehicle inclination angle, a vehicle drive gear selection, a vehicle mass, a vehicle weight, a vehicle trailer weight, or a vehicle air line pressure), engine properties (e.g., an engine fuel flow rate, an engine air flow rate, an engine boost pressure, an engine intake pressure, an engine load, an engine rotational speed, an engine cylinder temperature, an engine cylinder pressure, or an engine fuel pressure), exhaust properties, and/or reductant properties (e.g., flow rates, momentum, evaporation, temperatures, a reductant air supply pressure, a reductant air supply flow rate, a reductant spray cone angle, and/or densities) with system and component characteristics (e.g., doser nozzle geometry, such as orifice diameter) to determine a desired reductant injection droplet and spray momentum for an ideal in-exhaust spray distribution and spatial placement. The controller can then control a reductant injection droplet size and/or spray momentum for an in-exhaust spray distribution and spatial placement, such as by adjusting a reductant injection supply pressure, adjusting a dosing frequency, or doser nozzle geometry. Thus, the controller can control either single droplets or a spray cloud (e.g., the mathematical integration of all the single droplets). The foregoing are illustrative examples of control actions to deliver a desired momentum/distribution, but other possible mechanisms to deliver a desired momentum/distribution may be utilized, either in addition or in lieu of the foregoing. By controlling a reductant injection droplet momentum for a desired in-exhaust spray distribution and spatial placement, an optimization of emissions treatment efficiencies (e.g. a high distribution and/or $deNO_x$ percentage) and minimization of inefficiencies (e.g. impaction/impingement of reductant on an internal pipe geometry, such as walls, mixers, diffusers, flow directors, etc.) can be achieved.

Figure 2:
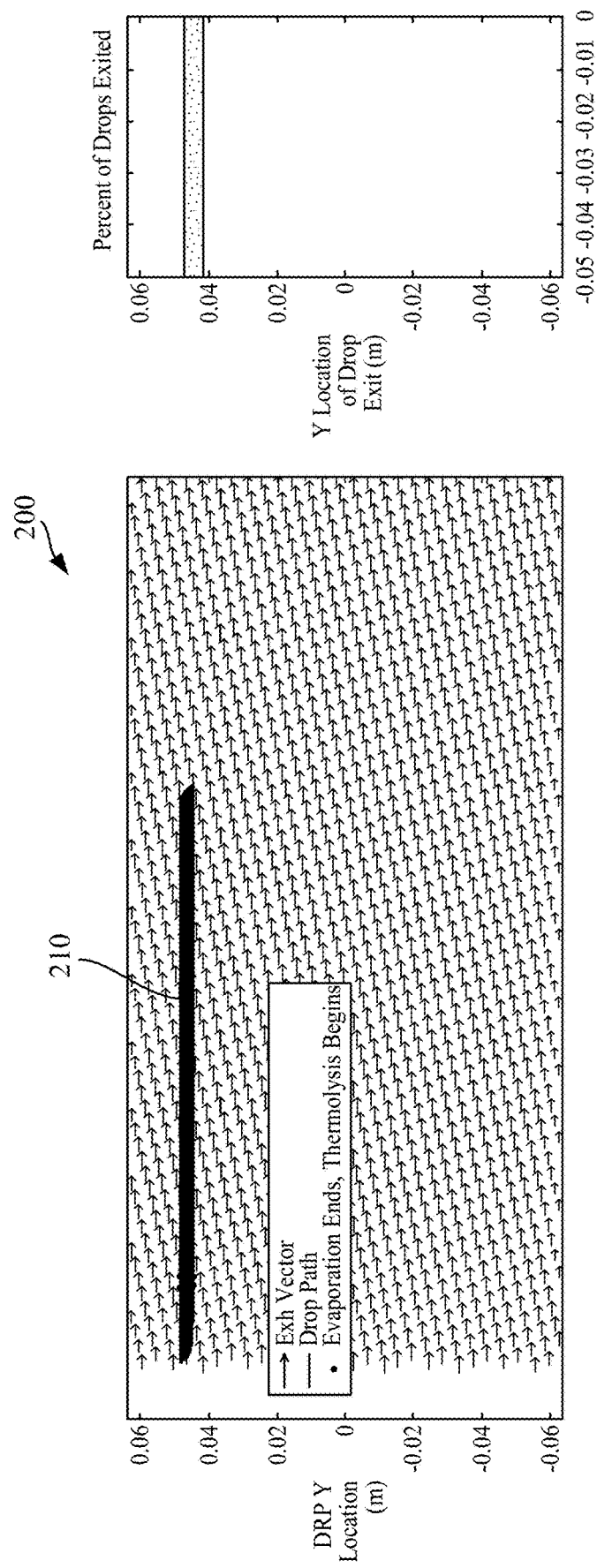
FIG. 2 is a graphical diagram depicting droplet paths in an exhaust vector field with a droplet distribution graph for a system with no droplet control.

FIG. 2 depicts a graphical plot 200 of a flight path 210 of dosed reductant within a uniform exhaust vector flow. The dosed reductant is provided at a static, preset reductant droplet momentum from a doser. That is, regardless of the exhaust flow conditions, the dosed reductant is provided at a preset reductant droplet momentum based on a reductant injection supply pressure, a reductant injection frequency, and a static doser nozzle geometry. As shown in the plot 200, the flight path 210 for an example droplet or set of droplets is linear in location, thereby resulting in substantially all of the dosed reductant being located at the injected location.

Such a static, preset reductant injection momentum remains at the dosed location in the exhaust flow and then requires either turbulation of the exhaust flow and/or a length of decomposition reactor pipe to disperse into the exhaust flow from the dosed location.

Figure 3:
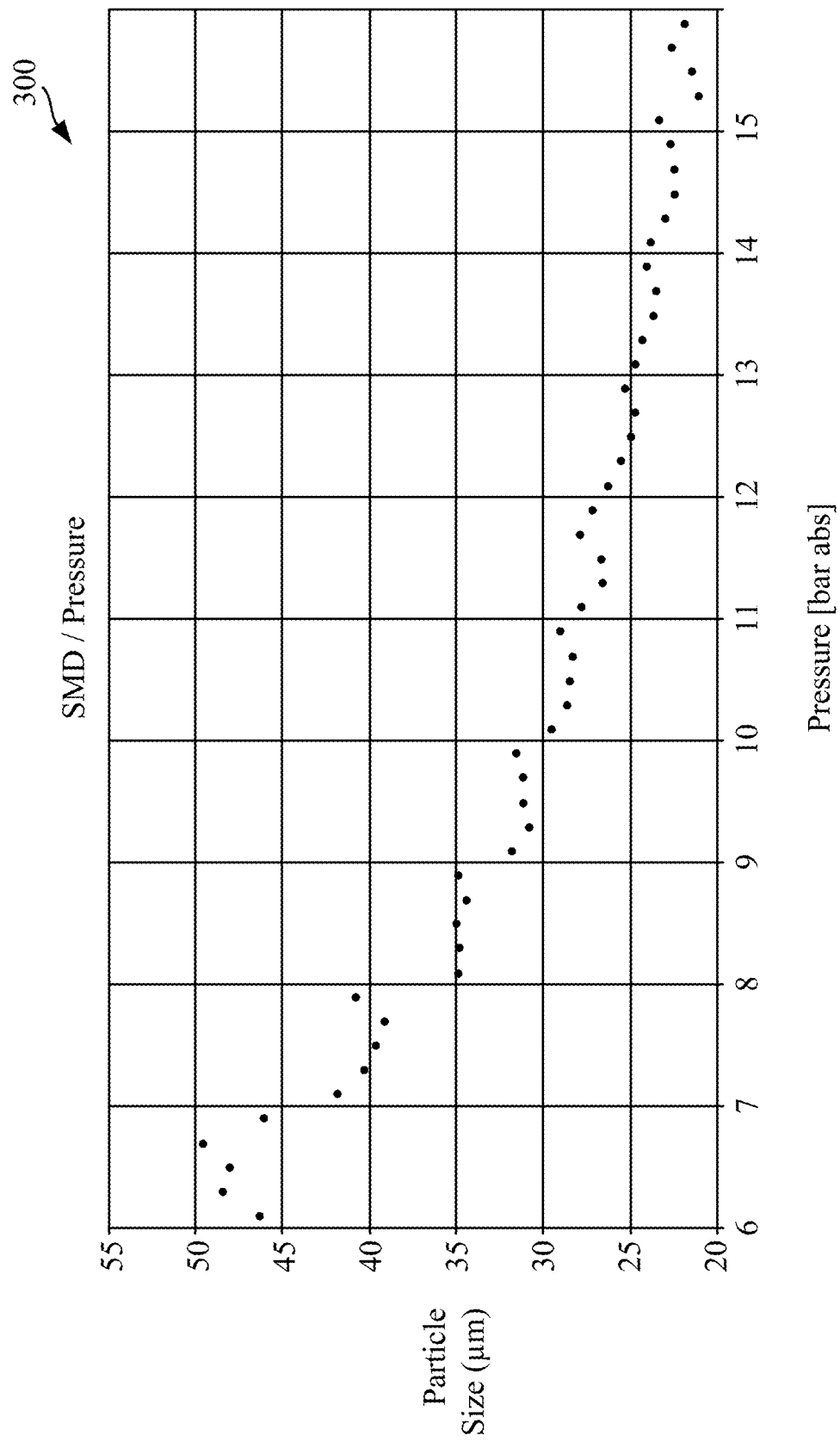
FIG. 3 is a graphical diagram of a distribution of droplet diameters as a function of injection pressure.

FIG. 3 depicts a graphical plot 300 showing a droplet particle size distribution as a function of reductant injection supply pressure. As shown in the plot 300, the reductant droplet diameter is larger at low injection supply pressures, such as 35 to 50 micrometers (µm) at reductant injection supply pressures of 6 to 8 bar. The reductant droplet diameter decreases as the reductant injection supply pressure increases, such as less than 25 µm at reductant injection pressures above 13 bar.

Figure 4:
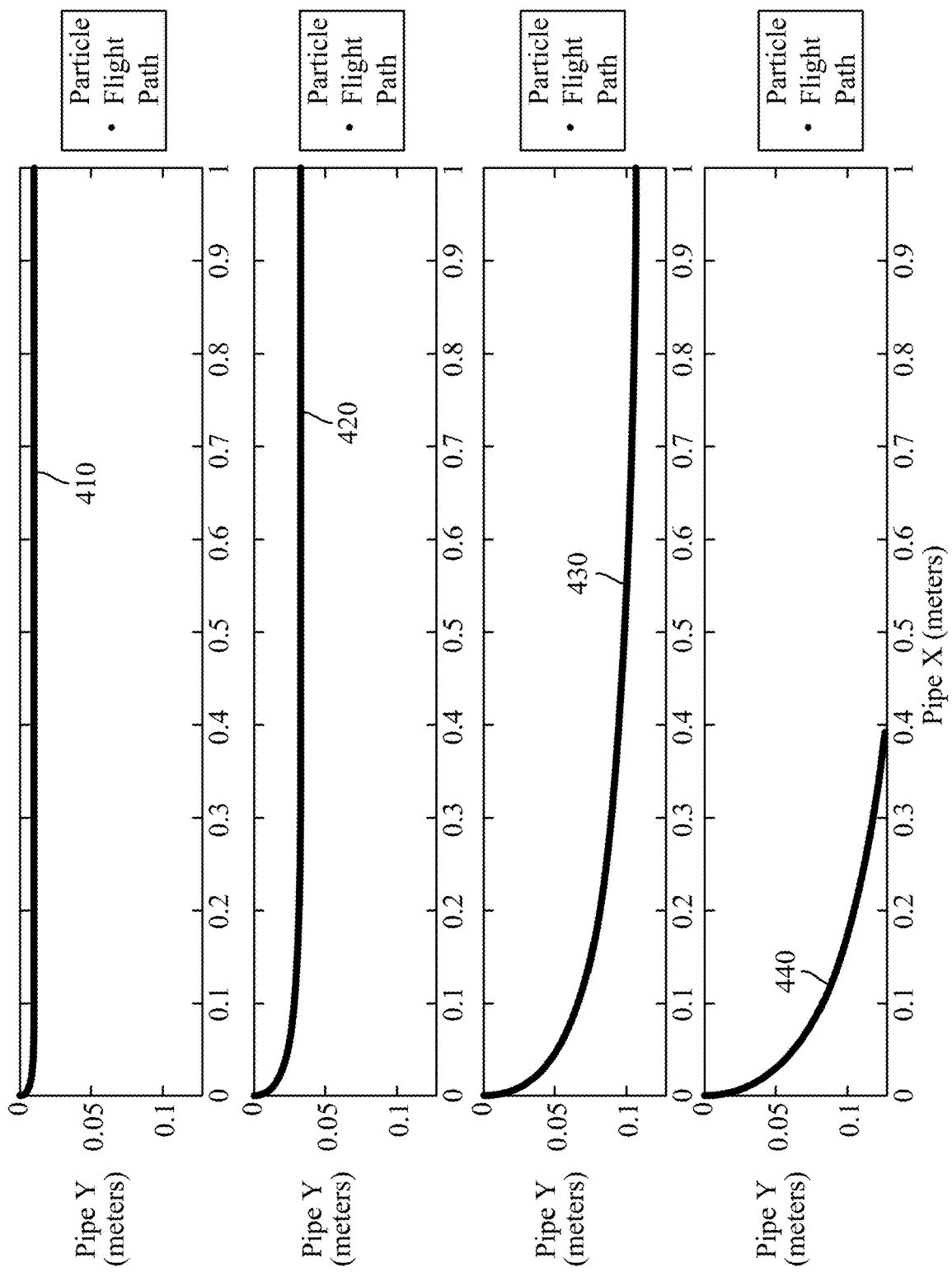
FIG. 4 is a set of graphical diagrams of particle flight paths of droplets of different diameters at the same injection velocity in an exhaust pipe having a uniform flow velocity field.

FIG. 4 depicts several flight paths 410, 420, 430, 440 for reductant droplets injected into an exhaust pipe at different reductant droplet diameters with a constant reductant injection supply pressure or injection velocity into a constant uniform exhaust flow field. A first flight path 410 corresponds to a droplet having a diameter of 20 µm and shows that the droplet has minimal penetration into the exhaust flow. A second flight path 420 corresponds to a droplet having a diameter of 40 µm and shows that the droplet has an improved further penetration into the exhaust flow. A third flight path 430 corresponds to a droplet having a diameter of 80 µm and shows that the droplet has further improved penetration into the exhaust flow. A fourth flight path 440 corresponds to a droplet having a diameter of 100 µm and shows that the droplet has still a further improved penetration into the exhaust flow. As shown by the flight paths 410, 420, 430, 440 for reductant droplets of varying diameters, the depth of penetration into an exhaust flow increases with increased reductant droplet diameter for reductant injected at the same injection supply pressure or injection velocity.

At low temperatures, decomposition time for reductant droplets increases due to chemical kinetic limitations. Thus, at lower temperatures, ensuring small reductant droplet diameters improves quick decomposition within the exhaust flow. In addition, when reductant droplets are small, the depth of penetration is limited, which may be preferred at idle or near idle conditions when exhaust flow velocity is low, and thus drag is also low.

Figure 5:
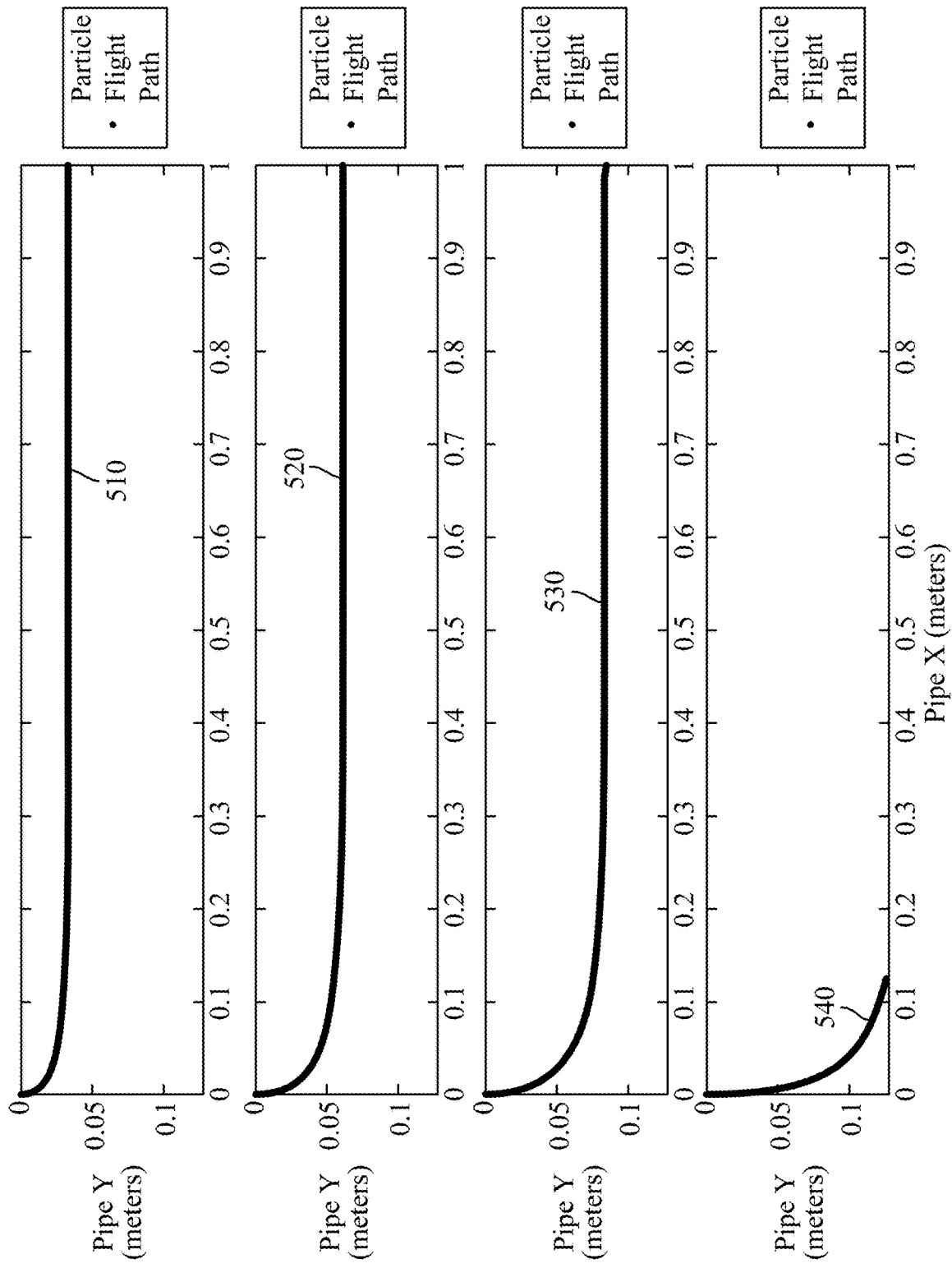
FIG. 5 is a set of graphical diagrams of particle flight paths of droplets having the same diameter at different injection velocities or momentums in an exhaust pipe having a uniform flow velocity field.

FIG. 5 depicts several flight paths 510, 520, 530, 540 for a 40 µm diameter reductant droplet injected into an exhaust pipe at different reductant injection velocities (which is directly based on the reductant injection supply pressure) with a constant reductant droplet diameter into a constant uniform exhaust flow field. A first flight path 510 corresponds to a droplet having an injection velocity of 20 meters per second (m/s) and shows that the droplet has minimal penetration into the exhaust flow. A second flight path 520 corresponds to a droplet having an injection velocity of 40 µm/s and shows that the droplet has an improved further penetration into the exhaust flow. A third flight path 530 corresponds to a droplet having an injection velocity of 60 µm/s and shows that the droplet has further improved penetration into the exhaust flow. A fourth flight path 540 corresponds to a droplet having an injection velocity of 120 µm/s and shows that the droplet has still a further improved penetration into the exhaust flow. As shown by the flight paths 510, 520, 530, 540 for reductant droplets of varying injection velocities, which directly correlate to the injection supply pressure, the depth of penetration into an exhaust flow increases with increased injection supply pressure for reductant injected at the same reductant droplet diameter.

Figure 6:
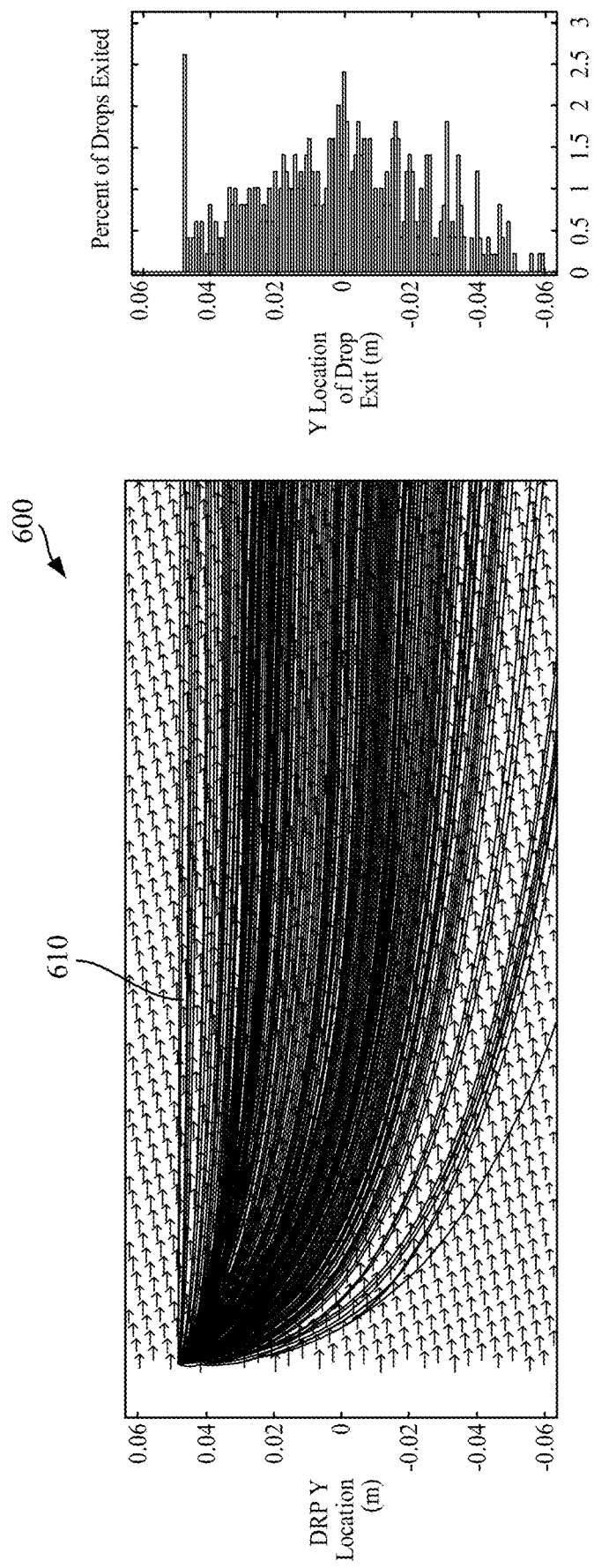
FIG. 6 is a graphical diagram depicting droplet paths in an exhaust vector field with a droplet distribution graph for a system with droplet control.

FIG. 6 a graphical plot 600 of a flight path 610 of dosed reductant within a uniform exhaust vector flow. The dosed reductant is provided at varying reductant droplet momentums from a doser such that reductant droplets take different paths within the exhaust flow to provide a larger distribution of reductant droplets compared to the flight path 210 shown in FIG. 2. That is, based on the exhaust flow conditions, the dosed reductant is provided at different reductant droplet momentums based on changes to a reductant injection supply pressure, a reductant injection frequency, and/or a variable doser nozzle geometry. As shown in the plot 600, the flight path 610 for the injected droplets penetrates to multiple locations in the exhaust flow, thereby resulting in a better in-exhaust distribution. Such a varying reductant injection momentums can dose reductant to multiple locations in the exhaust flow, which may reduce or eliminate the need for exhaust flow turbulation and/or reduction to the length of a decomposition reactor pipe from the dosed location to a face of a downstream catalyst.

The injected reductant momentum can be determined based on solving the following equations:

$$\frac{P_1}{\rho_1} + \frac{1}{2} * V_1^2 + g * Z_1 = \frac{P_2}{\rho_2} + \frac{1}{2} * V_2^2 + g * Z_2 \qquad \text{Eq. 1}$$

$$P_1 = f(T_1, d_1) \qquad \text{Eq. 2}$$

$$\rho_1 = f(T_1) \qquad \text{Eq. 3}$$

$$V_1 = f(P_1) \qquad \text{Eq. 4}$$

$$d_1 = f(T_1) \qquad \text{Eq. 5}$$

$$P_2 = f(T_e, P_e, V_e) \qquad \text{Eq. 6}$$

$$\rho_2 = f(T_e) \qquad \text{Eq. 7}$$

$$V_2 = f(P_e, P_2, V_e) \qquad \text{Eq. 8}$$

$$d_2 = f(T_e, T_1) \qquad \text{Eq. 9}$$

where:
$T_1$ Temperature of fluid upstream of orifice, [C]
$\rho_1$ Density of fluid upstream of the orifice, [kg/m$^3$]
$\rho_2$ Density of fluid at the orifice, [kg/m$^3$]
$T_e$ Exhaust gas temperature, [° C.]
$\rho_e$ Density of exhaust gas, [kg/m$^3$]
$P_e$ Exhaust gas pressure, [Pa]
$V_e$ Exhaust gas velocity, [m/s]

FIG. 7 depicts an implementation of a process 700 for developing a control model for droplet control in an exhaust system. The control model may be an empirical model, analytical model, or a physics based model. The process 700 includes identifying an exhaust system platform and setting up a Latin hypercube study for droplet control. The identification of an exhaust system platform may be a particular configuration for an exhaust system. The Latin hypercube study is based on geometrical data for the exhaust system platform and ranges for variable exhaust and reductant properties. The ranges for exhaust properties may include exhaust gas density, exhaust pressure, exhaust flow velocity, exhaust mass flow, exhaust temperature, exhaust vorticity, etc. The ranges for reductant properties may include reductant velocity based on reductant injection supply pressure, reductant droplet diameter, variable nozzle geometries, etc. The process 700 further includes performing the Latin hypercube study on droplet control using a set of one or more ordinary, partial, linear, or nonlinear differential equations to solve for resulting flow distributions and/or other values for each value of the ranges of exhaust properties and reductant properties. The Latin hypercube study is performed to compute parameters of the empirical model or physics based model for an exhaust system platform using a range of values for exhaust properties and reductant properties The process 700 also includes determining if the results of the Latin hypercube study being above a predetermined clustering density and performing a regression analysis to develop a control model for the controller of an engine having the exhaust system platform. The process 700 further includes determining if the model substantially conforms or agrees with the set of one or more ordinary, partial, linear, or nonlinear differential equation solution, such as by inputting test values into the control model and the ordinary differential equation solution and comparing an error between the output values to a predetermined threshold, such as ±5%. If the test values are within the predetermined error threshold, then the control model may be implemented into the controller of the engine.

FIG. 8 depicts an implementation of a process 800 for implementing the developed control model of FIG. 7 for droplet control in an exhaust system. The process 800 includes accessing current vehicle properties (e.g., a vehicle speed, a vehicle tire pressure, a vehicle inclination angle, a vehicle drive gear selection, a vehicle mass, a vehicle weight, a vehicle trailer weight, or a vehicle air line pressure), engine properties (e.g., an engine fuel flow rate, an engine air flow rate, an engine boost pressure, an engine intake pressure, an engine load, an engine rotational speed, an engine cylinder temperature, an engine cylinder pressure, or an engine fuel pressure), exhaust gas properties, and/or reductant liquid properties (e.g., flow rates, momentum, evaporation, temperatures, a reductant air supply pressure, a reductant air supply flow rate, a reductant spray cone angle, and/or densities), and a target spatial reductant distribution. In some implementations, the target spatial reductant distribution is a uniform distribution of reductant in the exhaust system. In other implementations, the target spatial reductant distribution may be an asymmetrical or other non-uniform reductant distribution, such as an asymmetrical distribution of reductant for an elbow of a pipe. A reductant distribution can refer to a particle spectral density, which is a statistical measure of the percentage of droplets of a certain diameter in a spray cloud.

The current vehicle condition properties may be based on sensed or virtual parameter values indicative of one or more properties of a vehicle speed, a vehicle tire pressure, a vehicle inclination angle, a vehicle drive gear selection, a vehicle mass, a vehicle weight, a vehicle trailer weight, or a vehicle air line pressure. The current engine condition properties may be based on sensed or virtual parameter values indicative of one or more properties of an engine fuel flow rate, an engine air flow rate, an engine boost pressure, an engine intake pressure, an engine load, an engine rotational speed, an engine cylinder temperature, an engine cylinder pressure, or an engine fuel pressure. The current exhaust gas properties may be based on sensed or virtual parameter values indicative of one or more properties of the exhaust gas flow through the exhaust system, such as an exhaust temperature, an exhaust density, an exhaust pressure, an exhaust flow velocity, an exhaust mass flow, an exhaust vorticity, etc. The current reductant liquid properties may be based on sensed or virtual values indicative of one or more properties of the reductant, such as a reductant temperature, reductant velocity based on injection supply pressure, reductant density, injection frequency, nozzle geometry, a reductant air supply pressure, a reductant air supply flow rate, a reductant spray cone angle, etc. The target spatial reductant distribution may be based on a preset reductant distribution and/or scalar value representative of a reductant distribution, such as a distribution of 0.9 indicative of reductant being dispersed through 90% of the exhaust flow.

The process 800 includes a real-time calculation of the reductant spray momentum needed to meet the target spatial reductant distribution. In some instances, a reductant droplet momentum, a reductant droplet spray momentum, or a reductant momentum vector may be used either in addition or in lieu of the reductant spray momentum. The reductant spray momentum is based on an injection supply pressure, a dosing frequency, a nozzle geometry, etc. The reductant spray momentum may be calculated using the control model from FIG. 7. A control parameter or set of control parameters (e.g., a commanded pump flow value, a nozzle orifice diameter, an injection frequency, etc.) is determined to meet the target spatial reductant distribution. In some implementations, the control parameter or set of control parameters are based on a determined injection supply pressure, dosing frequency, and nozzle geometry. In some implementations, the nozzle orifice size, nozzle interior angle, nozzle length or other physical properties of the doser nozzle geometry may be adjusted responsive to a control parameter. The process 800 includes comparing the determined control parameter value or set of control parameter values to current control parameter values and either maintaining the current control parameter values if the difference is zero or below a predetermine threshold (e.g., below 0.5% difference). If the determined control parameter values are different or above the predetermined threshold, then the process 800 includes determining if the determined control parameter values are within a range of parameter values for the exhaust system. For instance, a determined pump speed value may be outside the range of pump speeds capable of the pump of the exhaust system. In such an instance, the current control parameter value is set to the maximum or minimum value. If the determined control parameter values are within the range of parameter values for the exhaust system, then the current control parameter values are updated to the determined control parameter values. Thus, the process 800 permits the controller to control the different components of the reductant supply system and/or reductant dosing system to vary control parameters to obtain a desired reductant spray momentum to meet the target spatial reductant distribution.

In some implementations, the control parameter values may be values stored in a look-up table that the controller determines based on the accessed current exhaust gas properties, current reductant liquid properties, and target spatial reductant distribution. In other implementations, the control parameter values may be determined based on real-time solving of a set of one or more ordinary, partial, linear, or nonlinear differential equations by the controller to provide real-time control using the current exhaust gas properties, reductant liquid properties, and target spatial reductant distribution.

In some implementations, the reductant supply system may have one or more characteristics that may be modified (e.g., pump speed, valve position, etc.) with a constant characteristic reductant injection system such that only the characteristics of the reductant supply system may be modified. In other implementations, the reductant injection system may have one or more characteristics that may be modified (e.g., air supply pressure, nozzle geometry, dosing frequency, etc.) with a constant characteristic reductant supply system such that only the characteristics of the reductant injection system may be modified. In further implementations, both the reductant injection system and the reductant supply system may have one or more characteristics that may be modified (e.g., pump speed, valve position, air supply pressure, nozzle geometry, dosing frequency, etc.).

For instance, at low exhaust flow rates, a lower momentum is needed to ensure a target spray distribution in the exhaust flow. As momentum is a function of both mass and velocity, the system can modify either or both of these injection characteristics to deliver the dosed reductant at the target spray distribution. In one implementation, the system could modify the operating pressure of the reductant supply system while maintaining constant characteristics for the reductant injection system. In another implementation, the system could modify the operating orifice diameter of the reductant injection system while maintaining constant characteristics for the reductant supply system. In a further implementation, the system could modify the operating pressure of reductant supply system while modifying the operating orifice diameter of the reductant injection system. Each of the foregoing control actions reduce the droplet momentum to achieve the target spray distribution.

By adapting the reductant supply and/or injection systems to control the reductant spray momentum, the system can decrease deposit formation and increase reductant distribution for high performance of NOx reduction SCR systems.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
a reductant injection system for injecting reductant into an exhaust gas based on an injection parameter or a supply parameter; and
a controller configured to:
access a current engine condition parameter, wherein the current engine condition parameter comprises at least one of an engine fuel flow rate, an engine air flow rate, an engine boost pressure, an engine intake pressure, an engine load, an engine rotational speed, an engine cylinder temperature, an engine cylinder pressure, or an engine fuel pressure,
determine one or more control parameters based on a control model and as a function of the accessed current engine condition parameter, and
modify a value of the injection parameter or the supply parameter based on the one or more control parameters to control a reductant spray momentum, a reductant droplet momentum, or a reductant momentum vector from the reductant injection system so as to provide a target spray droplet distribution or a target spray distribution.

2. The system of claim 1, wherein the control model is based on a Latin hypercube study performed to compute parameters of an empirical model for an exhaust gas system platform using a range of values for exhaust gas properties and reductant properties.

3. The system of claim 1, wherein:
the controller is further configured to access at least one of a current exhaust gas condition parameter, a current vehicle condition parameter, or a current reductant condition parameter; and
the one or more control parameters are determined further based on the at least one of the current exhaust gas condition parameter, the current vehicle condition parameter, or the current reductant condition parameter.

4. The system of claim 3, wherein:
the controller is configured to access the current reductant condition parameter;
the one or more control parameters are determined based on the current reductant condition parameter; and
the current reductant condition parameter comprises at least one of a reductant temperature, reductant momentum based on an injection supply pressure, a reductant density, a reductant air supply pressure, a reductant air supply flow rate, or a reductant spray cone angle.

5. The system of claim 3, wherein:
the controller is configured to access the current exhaust gas condition parameter;
the one or more control parameters are determined based on the current exhaust gas condition parameter; and
the current exhaust gas condition parameter comprises at least one of an exhaust gas pressure, an exhaust gas density, an exhaust gas temperature, an exhaust gas flow velocity, an exhaust gas mass flow, or an exhaust gas vorticity.

6. The system of claim 5, wherein:
the controller is configured to access the current reductant condition parameter,
the one or more control parameters are determined based on the current reductant condition parameter, and
the current reductant condition parameter comprises at least one of a reductant temperature, reductant momentum based on an injection supply pressure, a reductant density, a reductant air supply pressure, a reductant air supply flow rate, or a reductant spray cone angle.

7. The system of claim 3, wherein:
the controller is configured to access the current vehicle condition parameter,
the one or more control parameters are determined based on the current vehicle condition parameter, and
the current vehicle condition parameter comprises at least one of a vehicle speed, a vehicle tire pressure, a vehicle inclination angle, a vehicle drive gear selection, a vehicle mass, a vehicle weight, a vehicle trailer weight, or a vehicle air line pressure.

8. The system of claim 1, wherein the control model is an empirical model.

9. The system of claim 1, wherein the control model is a physics based model.

10. The system of claim 9, wherein parameters of the physics based model are obtained by performing a Latin hypercube study for an exhaust gas system platform using a range of values for exhaust gas properties and reductant properties.

11. The system of claim 1, wherein the controller uses at least the current engine condition parameter to determine the reductant spray momentum and modifies the value of the injection parameter to achieve the target spray droplet distribution or the target spray distribution for the current engine condition parameter.

12. A method comprising:
accessing a current vehicle condition parameter, wherein the current vehicle condition parameter comprises at least one of a vehicle speed, a vehicle tire pressure, a vehicle inclination angle, a vehicle drive gear selection, a vehicle mass, a vehicle weight, a vehicle trailer weight, or a vehicle air line pressure;
determining one or more control parameters based on a control model and as a function of the accessed current vehicle condition parameter;
modifying a value of an injection parameter or a supply parameter based on the one or more control parameters to control a reductant spray momentum, a reductant droplet momentum, or a reductant momentum vector from a reductant injection system so as to provide a target spray droplet distribution or a target spray distribution; and
commanding the reductant injection system to inject reductant into an exhaust gas based on the injection parameter or a reductant supply system to supply reductant to the reductant injection system based on the supply parameter.

13. The method of claim 12, wherein at least the current vehicle condition parameter is used to determine the reductant spray momentum and to modify the injection parameter to achieve the target spray droplet distribution or the target spray distribution for the current vehicle condition parameter.

14. The method of claim 12, further comprising accessing at least one of a current engine condition parameter, a current exhaust gas condition parameter, or a current reductant condition parameter;

wherein the one or more control parameters are determined further based on the at least one of the current engine condition parameter, the current exhaust gas condition parameter, or the current reductant condition parameter.

15. The method of claim 14, further comprising accessing the current reductant condition parameter;
- wherein the one or more control parameters are determined based on the current reductant condition parameter, and
- wherein the current reductant condition parameter comprises at least one of a reductant temperature, reductant momentum based on an injection supply pressure, a reductant density, a reductant air supply pressure, a reductant air supply flow rate, or a reductant spray cone angle.

16. The method of claim 14, further comprising accessing the current engine condition parameter;
- wherein the one or more control parameters are determined based on the current engine condition parameter, and the current engine condition parameter comprises at least one of an engine fuel flow rate, an engine air flow rate, an engine boost pressure, an engine intake pressure, an engine load, an engine rotational speed, an engine cylinder temperature, an engine cylinder pressure, or an engine fuel pressure.

17. The method of claim 16, further comprising accessing the current reductant condition parameter;
- wherein the one or more control parameters are determined based on the current reductant condition parameter, and
- wherein the current reductant condition parameter comprises at least one of a reductant temperature, reductant momentum based on an injection supply pressure, a reductant density, a reductant air supply pressure, a reductant air supply flow rate, or a reductant spray cone angle.

18. The method of claim 14, further comprising accessing the current exhaust gas condition parameter;
- wherein the one or more control parameters are determined based on the current exhaust gas condition parameter, and the current exhaust gas condition parameter comprises at least one of an exhaust gas pressure, an exhaust gas density, an exhaust gas temperature, an exhaust gas flow velocity, an exhaust gas mass flow, or an exhaust gas vorticity.

19. The method of claim 12, wherein the control model is an empirical model.

20. The method of claim 12, wherein the control model is a physics based model.

* * * * *